United States Patent [19]

Brown et al.

[11] Patent Number: 5,505,487
[45] Date of Patent: Apr. 9, 1996

[54] SIDE IMPACT HEAD AIR BAG MODULE

[75] Inventors: Louis R. Brown, Oxford; Edward J. Burley, Romeo, both of Mich.

[73] Assignee: TRW Vehicle Safety Systems, Inc., Lyndhurst, Ohio

[21] Appl. No.: 441,329

[22] Filed: May 15, 1995

[51] Int. Cl.⁶ .................................................. B60R 21/22
[52] U.S. Cl. .......................... 280/730.1; 280/741
[58] Field of Search ........................... 280/730.1, 730.2, 280/731, 732, 741

[56] References Cited

U.S. PATENT DOCUMENTS

| | | | |
|---|---|---|---|
| 3,623,768 | 11/1971 | Capener et al. | 280/730.2 |
| 3,664,682 | 5/1972 | Wycech | 280/730.1 |
| 3,703,313 | 11/1972 | Schiesterl et al. | 280/730.1 |
| 3,953,049 | 4/1976 | Surace et al. | 280/730.1 |
| 4,946,191 | 8/1990 | Putsch | 280/730.1 |
| 5,273,309 | 12/1993 | Lau et al. | 280/730.2 |

FOREIGN PATENT DOCUMENTS

0611684A1 2/1994 European Pat. Off. .

OTHER PUBLICATIONS

Advertisement brochure from PARS GmbH regarding "Seat Integrated Airbag for Side Impact Protection", PARS07.doc, Sep., 1993.
Advertisement from Johnson Controls, Inc., regarding "Structural Seat with Integrated Air Bag", Automotive Engineering, p. 27, May., 1994.

*Primary Examiner*—Kenneth R. Rice
*Attorney, Agent, or Firm*—Tarolli, Sundheim, Covell, Tummino & Szabo

[57] ABSTRACT

A side impact head air bag module (10) is mounted in a headrest (18) of a vehicle seat (12). The module (10) includes an inflator (32) mounted in a housing (34) fixed in the headrest (18). A mouth portion (250) of the air bag (30) is secured to the housing (34). A body portion (280) of the air bag (30) is folded and stored in a chute (36). The chute (36) is supported for sliding movement in a direction away from the inflator (32). Upon actuation of the inflator (32), the chute (24) and the body portion (280) of the air bag (30) move sideways in a first direction (220) out of the headrest (18) and away from the inflator (32). The body portion (280) of the air bag (30) then inflates forward in a second direction (300) to protect an occupant of the seat (12).

32 Claims, 4 Drawing Sheets

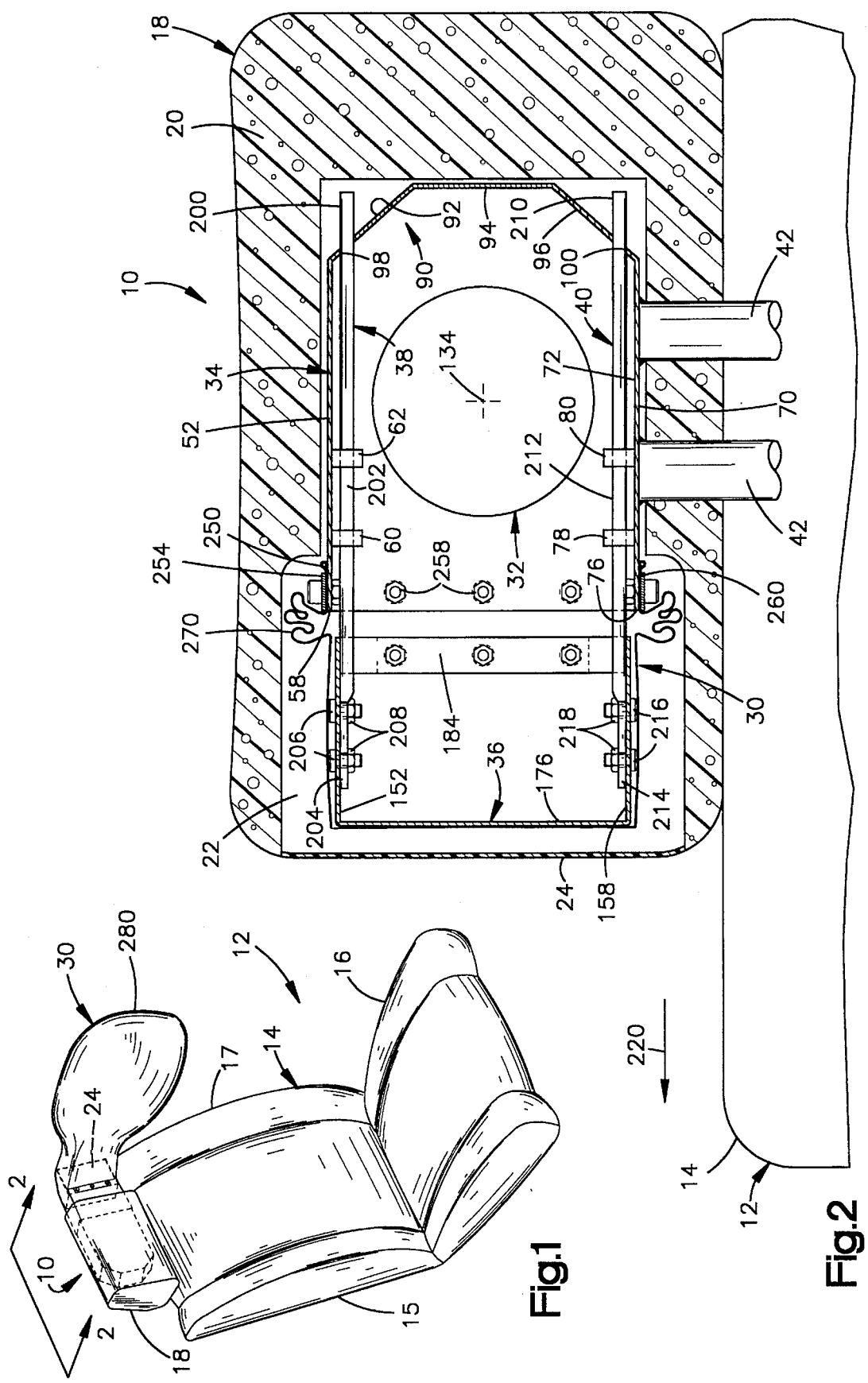

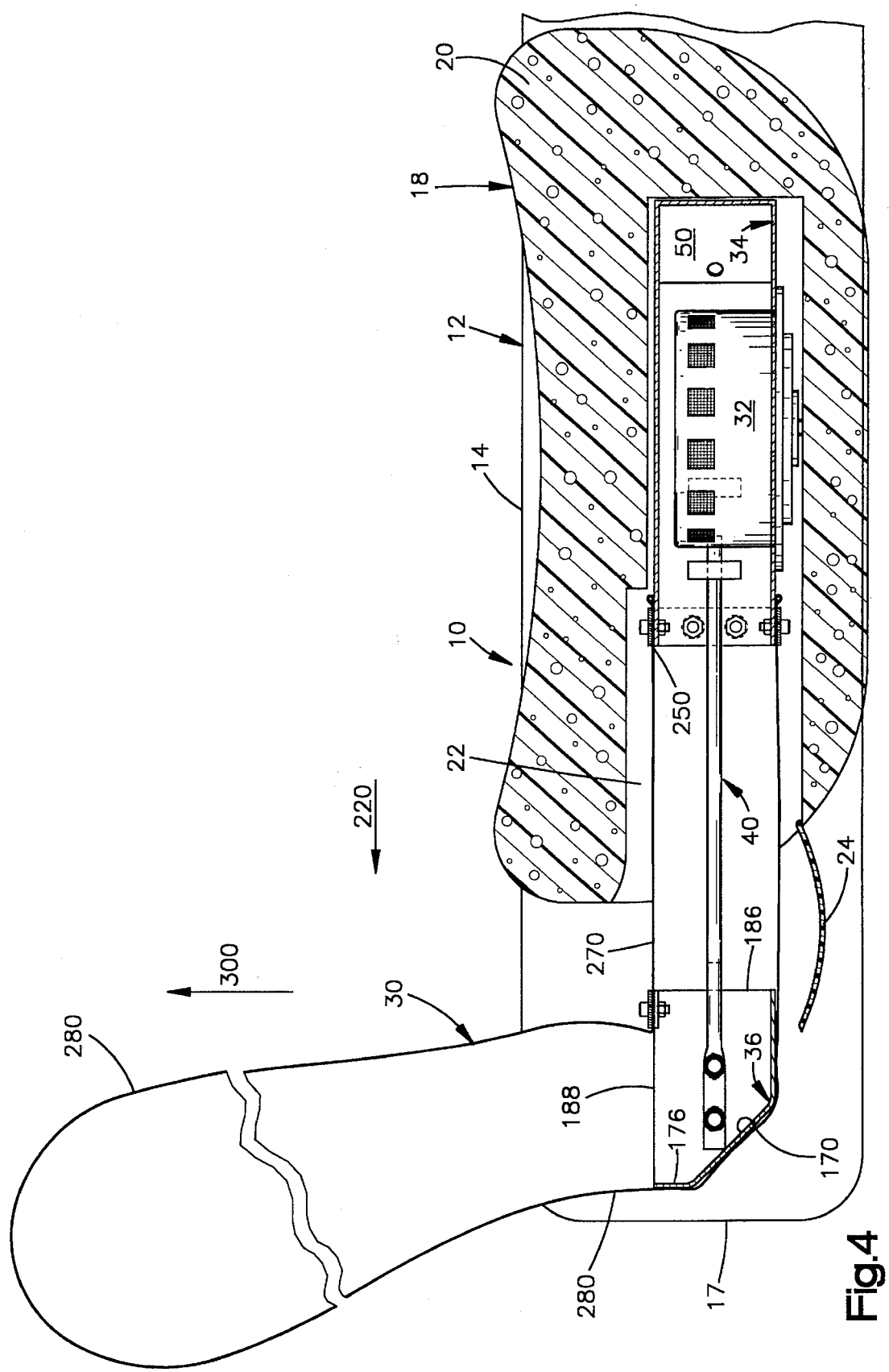

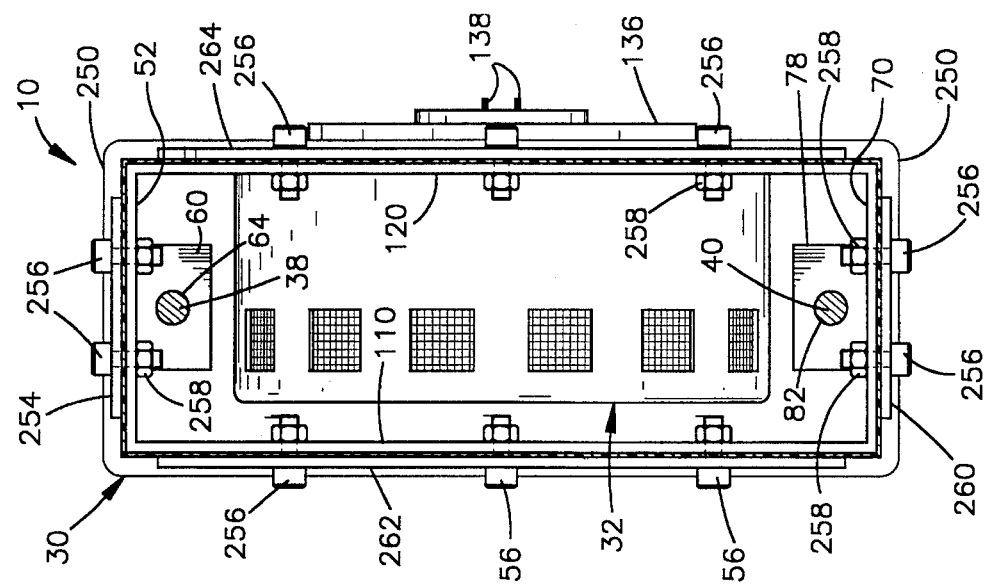
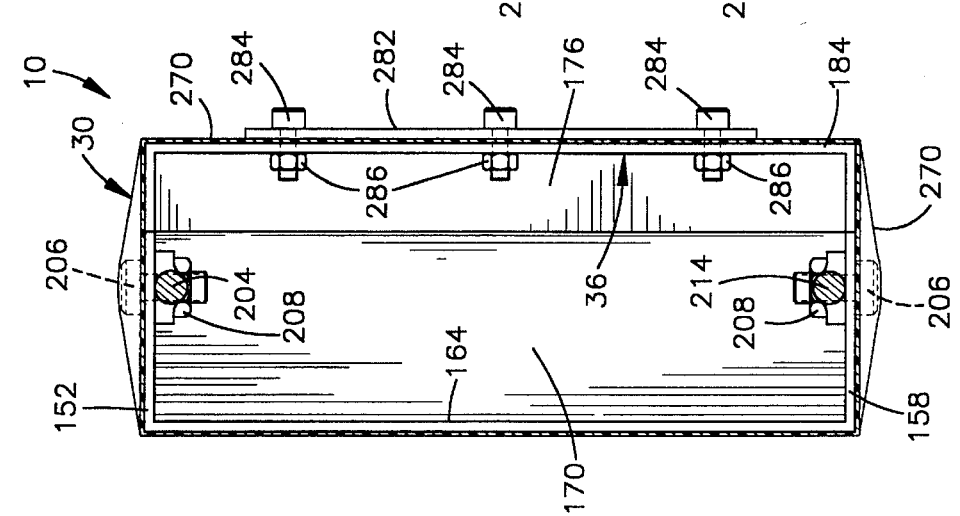
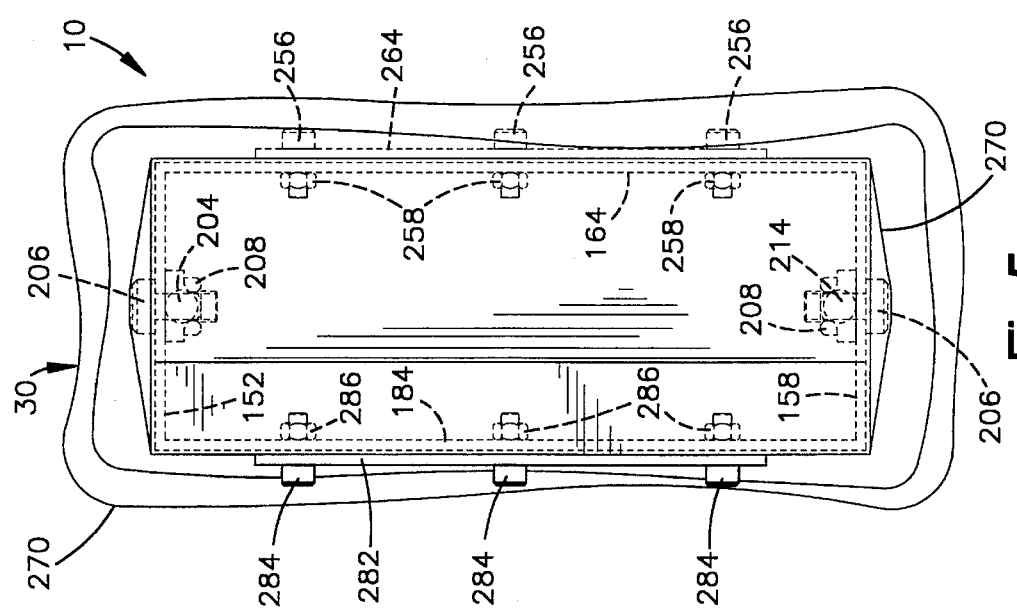

SIDE IMPACT HEAD AIR BAG MODULE

BACKGROUND OF THE INVENTION

1. Technical Field

The present invention relates to a vehicle safety apparatus and, particularly, relates to an air bag module including an inflatable vehicle occupant restraint, such as an air bag, to help protect a vehicle occupant in the event of a side impact to the vehicle.

2. Description of the Prior Art

It is known to inflate an air bag to help protect a vehicle occupant in the event of a side impact to a vehicle. The air bag is stored in a deflated condition, together with an inflator, in the vehicle seat in which an occupant sits. In the event of a side impact to the vehicle of a magnitude sufficient to require protection of the vehicle occupant, the inflator is actuated and the air bag is inflated into a position between the vehicle occupant and the adjacent side structure of the vehicle. The air bag can help protect the vehicle occupant from forcefully striking or being struck by parts of the vehicle side structure, such as the vehicle door. The air bag can also help protect the vehicle occupant from objects, such as a tree or a pole, which might intrude through the side structure of the vehicle during the side impact.

It is known to mount a side impact air bag in an upper portion of a vehicle seat back such as the headrest. The air bag inflates into a position to help protect the head of the vehicle occupant. The air bag inflates in a generally forward direction from the location in which the air bag is stored in the vehicle seat back. It also may be desirable that the air bag inflate forward from a location which is as far as possible toward the vehicle door.

SUMMARY OF THE INVENTION

The present invention is a vehicle occupant safety apparatus comprising an inflatable vehicle occupant restraint for, when inflated, helping to protect an occupant of a vehicle. The inflatable restraint has a deflated condition and an inflated condition. An inflator, when actuated, supplies inflation fluid to the inflatable restraint to inflate the inflatable restraint. The inflatable restraint has a mouth portion for receiving inflation fluid from the inflator and a body portion which is connected with the mouth portion. The mouth portion of the inflatable restraint is in fluid communication with the inflator. The apparatus includes a support for a first portion of the body portion of the inflatable restraint when the inflatable restraint is in the deflated condition. The apparatus also includes means for mounting the support and the first portion of the body portion of the inflatable restraint for movement from a first position in a first direction away from the inflator to a second position from which the body portion inflates into a position to help protect the vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a perspective view of a vehicle seat including a side impact head air bag module in accordance with the present invention, showing the module in an actuated condition in which the air bag is in an inflated condition;

FIG. 2 is a view partially in section looking in a forward direction, generally along line 2—2 of FIG. 1, at the air bag module of FIG. 1 prior to inflation of the air bag;

FIG. 4 is a view similar to FIG. 3 showing the air bag module mounted in the vehicle seat back and in the actuated condition;

FIG. 5 is a view taken along line 5—5 of FIG. 3;

FIG. 6 is a view taken along line 6—6 of FIG. 3; and

FIG. 7 is a view taken along line 7—7 of FIG. 3.

DESCRIPTION OF PREFERRED EMBODIMENT

Figure 3:
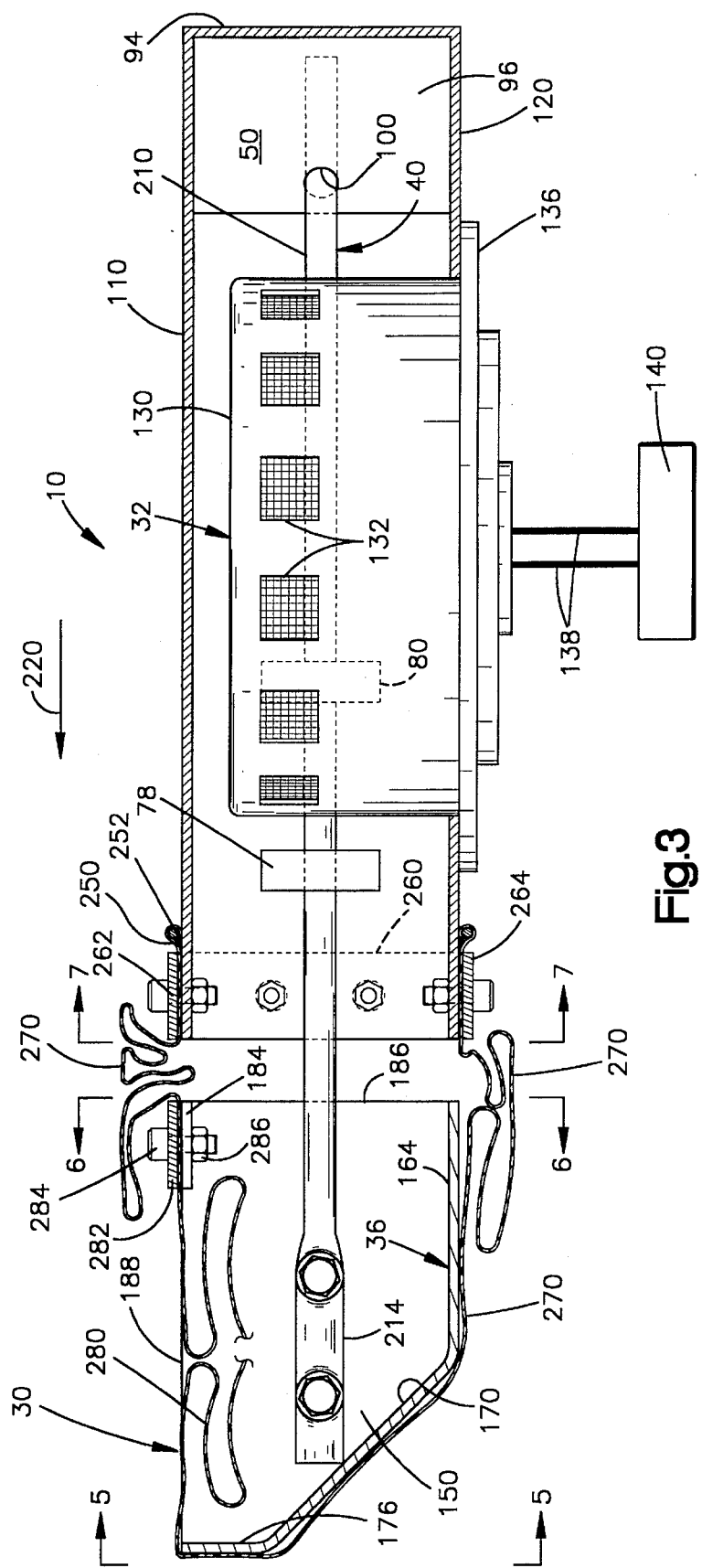
FIG. 3 is a top view partially in section of the air bag module of FIG. 1, shown in an unactuated condition.

The present invention relates to a vehicle safety apparatus and, particularly, relates to an apparatus for helping to protect an occupant of a vehicle in the event of a side impact to the vehicle wherein the magnitude of the impact is sufficient to require deployment of an inflatable vehicle occupant restraint. The present invention is applicable to various vehicle occupant safety apparatus constructions. As representative of the present invention, FIG. 1 illustrates a vehicle occupant safety apparatus or air bag module 10.

The air bag module 10 is mounted on a vehicle seat 12. The seat 12 includes a seat back 14 and a seat bottom portion 16. The seat back 14 has an inboard side 15 and an outboard side 17. A headrest 18 is supported on the seat back 14. The module 10 is disposed in the headrest 18 of the vehicle seat 12.

The headrest 18 (FIGS. 2 and 4) includes a body of foam material 20 within which is formed a cavity 22. A movable cover 24 is supported on the body of foam material. The cover 24 closes an open end of the cavity 22 and conceals the air bag module 10 when the module is in the unactuated condition shown in FIG. 2. The cover 24 is held in the closed position shown in FIG. 2 by a tear seam or tear stitches (not shown) or in any other suitable manner. The cover 24 is pivotable downward, upward, or rearward to the position shown in FIG. 4 in a manner described below upon actuation of the air bag module 10.

The module 10 includes an inflatable restraint or air bag 30 and an inflator 32. The inflator 32 is supported on a housing 34 of the air bag module 10. The module 10 also includes a container or chute 36 and a pair of guide rods 38 and 40.

The housing 34 (FIGS. 2 and 3) is supported in the cavity 22 in the headrest 18 by a pair of support posts 42 connected in a known manner to the seat frame (not shown) of the seat back 140. The housing 34 can be made from any material but is preferably made of sheet metal and includes a plurality of walls which define, in the housing, a chamber 50. An upper wall 52 (FIG. 2) of the housing 34 has a planar configuration and has an outer end portion 58 disposed farthest to the left as viewed in FIGS. 2 and 3. Two upper guide bushings 60 and 62 are mounted on the inner side surface of the upper wall 52 of the housing 34. Coaxial cylindrical passages 64 (FIG. 7) are formed in each of the bushings 60 and 62.

A planar lower wall 70 of the housing 34 extends parallel to the upper wall 52 and has an outer end portion 76 disposed farthest to the left as viewed in FIGS. 2 and 3. Two lower guide bushings 78 and 80 are mounted on the inner side surface 72 of the lower wall 70 of the housing 34. Coaxial cylindrical passages 82 (FIG. 7) are formed in each of the lower guide bushings 78 and 80.

The housing 34 includes an inner end wall 90, best seen in FIG. 2, which interconnects the upper wall 52 and the lower wall 70. The inner end wall 90 includes three interconnected planar wall portions 92, 94, and 96. An upper guide rod opening 98 is formed in the first part 92 of the inner end wall 90. A lower guide rod opening 100 is formed in the third part 96 of the inner end wall 90.

A planar front wall 110 (FIG. 3) of the housing 34 extends perpendicular to the upper and lower walls 52 and 70 and has an outer end portion which is disposed farthest to the left as viewed in FIGS. 2 and 3. The housing 34 also includes a planar back wall 120. The back wall 120 extends parallel to the front wall 110 and has an outer end portion located to the left as viewed in FIGS. 2 and 3.

The inflator 32 comprises a source of inflation fluid for inflating the air bag 30. As known in the art, the inflator 32 may contain an ignitable gas generating material which, when ignited, rapidly generates a large volume of gas. The inflator 32 may alternatively contain a stored quantity of pressurized inflation fluid, or a combination of pressurized inflation fluid and ignitable material for heating the inflation fluid.

The inflator 32 has a cylindrical main body portion 130. A plurality of fluid outlet openings 132 (FIG. 3) are equally spaced in a circular array around a central axis 134 (FIG. 2) of the inflator 32. The fluid outlet openings 132 (FIG. 3) enable inflation fluid to flow from the inflator 32 into the chamber 50 in the housing 34.

An annular mounting flange 136 of the inflator 32 projects radially outward from the main body portion 130. The mounting flange 136 is fastened, in a manner not shown, to the outer side surface of the back wall 120 of the housing 34 to secure the inflator 32 in position on the housing. A pair of lead wires 138 extend from the inflator 32 and are connected with known electric circuitry of the vehicle, indicated schematically at 140 (FIG. 3). The electric circuitry 140 includes a collision sensor and a power source, such as the vehicle battery, for actuation of the inflator in a known manner in the event of a side impact to the vehicle of a magnitude sufficient to require deployment of the air bag 30.

The chute 36 (FIGS. 3–6) is a box-like structure which is made from any material, preferably sheet metal, and which is supported by the guide rods 38 and 40 for sliding movement relative to the housing 34. The chute 36 includes a plurality of walls which define a chamber 150 in the chute. The plurality of walls includes an upper wall 152, an opposite lower wall 158, and a back wall 164 which extends between and interconnects the upper wall 152 and the lower wall. A deflector wall 170 (FIG. 3) of the chute 36 extends at an angle forward and outward from the back wall 164. In the illustrated embodiment, the deflector wall 170 extends at an angle of about 45° to the back wall 176. An outer end wall 176 of the chute 36 extends forward from the outer end of the deflector wall 170. The chute 36 also includes a laterally narrow connector wall 184 (FIGS. 2 and 3) which extends vertically between the forward inner portions of the upper wall 152 and the lower wall 158.

The walls 152, 158, 164, and 184 of the chute 36 define an inlet opening 186 in the chute 36. The inlet opening 186 is presented toward the inflator 32 and the housing 34. The walls 152, 158, 176, and 184 of the chute 36 define an outlet opening 188 in the chute 36. The outlet opening 188 is presented forward in the vehicle, that is, in an upward direction as viewed in FIGS. 3 and 4. The connector wall 184 of the chute 36 is disposed between the inlet opening 186 and the outlet opening 188.

The upper guide rod 38 (FIGS. 2 and 7) has a circular cross-sectional configuration. The guide rod 38 could alternatively have a different cross-sectional configuration. An inner end portion 200 of the upper guide rod 38 extends through the upper guide rod opening 98 in the first part 92 of the inner end wall 90 of the housing 34. A central portion 202 of the upper guide rod 38 extends through the passages in the upper guide bushings 60 and 62. A flattened outer end portion 204 of the upper guide rod 38 extends inside the chute 36. A pair of fasteners such as bolts 206 extend through fastener openings in the outer end portion 204 of the upper guide rod 38 and through openings in the upper wall 152 of the chute 36. A pair of nuts 208 are screwed on the bolts 206 to secure the upper guide rod 38 to the upper wall 152 of the chute 36.

The lower guide rod 40 is a mirror image of the upper guide rod 38. The lower guide rod 40 has an inner end portion 210 which extends through the lower guide rod opening 100 in the third part 96 of the inner end wall 90 of the housing 34. A central portion 212 of the lower guide rod 40 extends through the passages in the lower guide bushings 78 and 80. A flattened outer end portion 214 of the lower guide rod 40 extends inside the chute 36. A pair of bolts 216 extend through fastener openings in the outer end portion 214 of the lower guide rod 40 and through openings in the lower wall 158 of the chute 36. A pair of nuts 218 are screwed on the bolts 216 to secure the lower guide rod 40 to the chute 36.

The chute 36 is thus supported for sliding movement with the guide rods 38 and 40, relative to the housing 34. The chute 36 is movable in a first direction 220, that is, to the left as viewed in FIGS. 2–4, upon actuation of the inflator 32. The first direction 220 extends sideways in the vehicle, from the inboard side 15 of the seat back 14 toward the outboard side 17 of the seat back.

The air bag 30 (FIG. 3) includes a mouth portion 250 which is connected in fluid communication with the housing 34 and thereby with the inflator 32. The mouth portion 250 of the air bag 30 is tubular in configuration and wraps around the outer end portions of the upper and lower walls 52 and 70 and the outer end portions of the front and back walls 110 and 120, respectively, of the housing 34. The terminal end of the mouth portion 250 of the air bag 30 is sewn around a flexible welt 252 which is captured behind four retainer bars 254, 260, 262, and 264 secured to the walls of the housing 34. The upper retainer bar 254 (FIGS. 2 and 7) is fixed to the outer end portion of the upper wall 52 of the housing 34 with a pair of bolts 256 and nuts 258. The lower retainer bar 260 is fixed to the outer end portion of the lower wall 70 of the housing 34, also with a pair of bolts 256 and nuts 258. The front retainer bar 262 (FIGS. 3 and 7) is fixed to the outer end portion of the front wall 110 of the housing 34 with bolts 256 and nuts 258. The back retainer bar 264 is fixed to the outer end portion of the back wall 120 of the housing 34 with bolts 256 and nuts 258.

The retainer bars 254, 260, 262 and 264 clamp the mouth portion 250 of the air bag 30 to the walls of the housing 34. Accordingly, the mouth portion 250 of the air bag 30 is secured to the housing 34 to block movement of the mouth portion of the air bag away from the inflator 32 in the first direction 220, that is, to the left as viewed in FIGS. 2–4.

An elongate tubular neck portion 270 (FIGS. 2–4) of the air bag 30 extends between the mouth portion 250 and a body portion 280 of the air bag. The outer end of the neck portion 270 (that is, the leftmost portion as viewed in FIGS. 2–4) is clamped to the connector wall 184 of the chute 36 with a chute retainer bar 282 (FIGS. 3 and 6) and three bolts 284 and nuts 286. The air bag 30 wraps around the chute 36 and encloses the walls of the chute. At the outlet opening 188 in the chute 36, the body portion 280 of the air bag 30 is folded and stored inside the chute 36, in a manner as shown schematically in FIG. 3. The chute 36 acts as a support or container which supports the folded body portion 280 of the air bag for sliding movement in the first direction 220, with the chute and with the guide rods 38 and 40, relative to the housing 34 and the inflator 32.

It should be understood that some of the folded body portion 280 of the air bag 30 might not be disposed inside the chute 36. For example, some of the folded body portion 280 of the air bag 30 might project forward of the chute 36 when the module 10 is in the unactuated condition. However, as shown schematically in the drawings, at least a first part and preferably most, if not all, of the body portion 280 of the air bag 30 is folded and stored in the chute 36.

When the module 10 is in the unactuated condition shown in FIGS. 2 and 3, the chute 36 supports the folded body portion 280 of the air bag 30 in a first position disposed adjacent to the housing 34 and to the inflator 32. The chute 36 and the body portion 280 of the air bag 30 are disposed within the cavity 22 in the headrest 18 of the vehicle seat 12. The cover 24 of the headrest 18 is in the closed position shown in FIG. 2. The neck portion 270 of the air bag is in a collapsed condition loosely folded outside of the guide rods 38 and 40, as best seen in FIGS. 2 and 3.

In the event of a side impact to the vehicle of a magnitude sufficient for deployment of the air bag 30, the vehicle electric circuitry 140 actuates the inflator 32 in a known manner. The inflator 32 rapidly discharges a large quantity of inflation fluid at high pressure through the fluid outlet openings 132 into the chamber 50 in the housing 34. The pressure in the housing 34 increases as a result of the actuation of the inflator 32, and the increased fluid pressure is transmitted through the tubular neck portion 270 of the air bag 30 toward the chute 36. The inflation fluid contacts the folded body portion 280 the air bag 30 which is exposed through the inlet opening 186 in the chute 36.

When the pressure in the chamber 50 is greater than the frictional forces holding the chute 36 in the position shown in FIGS. 2 and 3, that is, when the pressure in the chamber reaches a first predetermined pressure, the force of the inflation fluid acting on the folded body portion 280 of the air bag 30 overcomes the inertia of the chute 36 and the body portion of the air bag. The chute 36 and the body portion 280 of the air bag 30 move in the first direction 220, that is, to the left as viewed in FIGS. 2–4. The neck portion 270 of the air bag 30 extends as shown in FIG. 4.

The moving chute 36 and body portion 280 of the air bag 30 engage the cover 24 of the headrest 18. The tear seam or tear stitches (not shown) holding the cover 24 in the closed position shown in FIG. 2 break, and the cover moves from the closed position to the open position shown in FIG. 4. The chute 36 and the folded body portion 280 of the air bag 30 move out of the cavity 22 in the foam material 20 of the headrest 18, to the actuated position shown in FIG. 4. When the chute 36 reaches the position shown in FIG. 4, the extended tubular neck portion 270 of the air bag 30 becomes stretched tight and stops movement of the chute 36 in the first direction 220.

The pressure in the housing 34 and in the neck portion 270 of the air bag 30 continues to increase as a result of the actuation of the inflator 32. When the increasing fluid pressure in the neck portion 270 of the air bag 30 reaches a second predetermined pressure, the body portion 280 of the air bag unfolds and moves out of the chute through the outlet opening 188 in the chute. The inflation fluid from the inflator 32 flows through the chute 36.

The inflation fluid enters the chute 36 in the direction 220 through the inlet opening 186. The deflector wall 170 and the outer wall 176 of the chute 36 deflect the inflation fluid flowing through the chute. The inflation fluid exits the chute in a second direction 300 (FIG. 4) through the outlet opening 188. The second direction 300 extends forward from the vehicle seat back 14, that is, transverse to the first direction 220.

The body portion 280 of the air bag 30 moves from the folded and stored condition illustrated in FIG. 3 to the unfolded and inflated condition illustrated schematically in FIG. 4. The body portion 280 of the air bag 30 inflates in the second direction 300 into a position to help protect the vehicle occupant.

From the above description of the invention, those skilled in the art will perceive improvements, changes and modifications in the invention. For example, the module 10 could be mounted at a location other than in the headrest 18, for example in the seat back 14. The chute could move upward instead of laterally and the air bag could deploy forward. Such improvements, changes and modifications within the skill of the art are intended to be covered by the appended claims.

Having described the invention, we claim:

1. A vehicle occupant safety apparatus comprising:

an inflatable vehicle occupant restraint for, when inflated, protecting an occupant of a vehicle, said inflatable restraint having a deflated condition and an inflated condition;

an inflator for, when actuated, supplying inflation fluid to said inflatable restraint to inflate said inflatable restraint;

said inflatable restraint having a mouth portion which is in fluid communication with said inflator for receiving inflation fluid from said inflator and a body portion which is connected with said mouth portion;

a support for at least a first part of said body portion of said inflatable restraint when said inflatable restraint is in the deflated condition; and means for mounting said support and said first part of said body portion of said inflatable restraint for movement from a first position in a first direction away from said inflator to a second position from which said body portion inflates into a position to protect the vehicle occupant.

2. A vehicle occupant safety apparatus as set forth in claim 1 wherein said support encloses said first part of said body portion of said inflatable restraint, said support defining a fluid inlet for receiving inflation fluid flowing in said first direction from said inflator and a fluid outlet for directing inflation fluid into said body portion of said inflatable restraint.

3. A vehicle occupant safety apparatus as set forth in claim 2 wherein said support includes at least one wall which extends at an acute angle to said first direction for deflecting flow of inflation fluid through said support from said first direction to a second direction as said inflation fluid is directed into said body portion of said inflatable restraint.

4. A vehicle occupant safety apparatus as set forth in claim 1 comprising a housing, means for securing said inflator to said housing, and means for securing said mouth portion of said inflatable restraint to said housing, said means for mounting said support comprising a plurality of guide members fixed for movement with said support, said guide members being supported for sliding movement relative to said mouth portion of said inflatable restraint.

5. A vehicle occupant safety apparatus as set forth in claim 1 wherein said support comprises a container having wall means for maintaining said first portion of said body portion of said inflatable restraint in a folded condition during movement from the first position to the second position.

6. A vehicle occupant safety apparatus as set forth in claim 1 wherein said support is disposed inside said inflatable restraint.

7. A vehicle occupant safety apparatus as set forth in claim 1 wherein said inflatable restraint includes an elongate tubular neck portion having first and second opposite end portions, said first end portion comprising said mouth portion of said inflatable restraint, said second end portion being connected in fluid communication with said body portion of said inflatable restraint, said apparatus comprising first securing means for connecting said first end portion of said neck portion of said inflatable restraint with said inflator to block movement of said mouth portion relative to said inflator, said apparatus further comprising second securing means movable relative to said first securing means for securing said second end portion of said neck portion of said inflatable restraint to said support at a location spaced apart from said first securing means.

8. A vehicle occupant safety apparatus as set forth in claim 7 wherein said tubular neck portion of said inflatable restraint includes a section of said inflatable restraint which extends between said first securing means and said second securing means and which is extensible from a collapsed condition when said support is in the first position to an extended condition when said support is in the second position, said extensible section of said inflatable restraint when in the extended condition being tensioned to limit movement of said support in said first direction.

9. A vehicle occupant safety apparatus as set forth in claim 1 wherein said first part of said body portion of said inflatable restraint inflates in a second direction generally transverse to said first direction.

10. A vehicle occupant safety apparatus as set forth in claim 9 wherein said first direction is a sideways direction in the vehicle and said second direction is a forward direction in the vehicle.

11. A vehicle occupant safety apparatus as set forth in claim 1 further comprising means for mounting said inflatable restraint and said inflator in a headrest portion of a vehicle seat back for helping to protect the vehicle occupant in the event of a side impact to the vehicle of a magnitude sufficient to require deployment of said inflatable restraint.

12. A vehicle occupant safety apparatus as set forth in claim 11 wherein the vehicle seat back has inboard and outboard sides, said first direction extending in a direction from the inboard side of the vehicle seat back to the outboard side of the vehicle seat back, said body portion of said inflatable restraint inflating in a second direction which extends forward from the vehicle seat back.

13. A vehicle occupant safety apparatus comprising:

an inflatable vehicle occupant restraint for, when inflated, helping to protect an occupant of a vehicle, said inflatable restraint having a deflated condition and an inflated condition;

an inflator for, when actuated, supplying inflation fluid to said inflatable restraint to inflate said inflatable restraint;

said inflatable restraint having a mouth portion which is in fluid communication with said inflator for receiving inflation fluid from said inflator and a body portion which is connected with said mouth portion;

a container within which at least a first part of said body portion of said inflatable restraint is disposed when said inflatable restraint is in the deflated condition; and means for supporting said container and said first part of said body portion of said inflatable restraint for movement in a first direction away from said inflator from a first position to a second position from which said first part of said body portion inflates into a position to help protect the vehicle occupant.

14. A vehicle occupant safety apparatus as set forth in claim 13 wherein said container comprises walls which enclose said first part of said body portion of said inflatable restraint, said means for supporting said container being connected with at least one of said walls of said container, said walls at least partially defining a fluid inlet for receiving inflation fluid flowing in said first direction from said inflator and a fluid outlet for directing inflation fluid into said body portion of said inflatable restraint.

15. A vehicle occupant safety apparatus as set forth in claim 14 wherein said walls include at least one wall which extends at an angle to said first direction for deflecting the flow of inflation fluid through said container from said first direction to a second direction as said inflation fluid is directed into said body portion of said inflatable restraint.

16. A vehicle occupant safety apparatus as set forth in claim 13 comprising a housing, means for securing said inflator to said housing, and means for securing said mouth portion of said inflatable restraint to said housing, said means for supporting said container comprising means for connecting said container with said housing for sliding movement relative to said housing.

17. A vehicle occupant safety apparatus as set forth in claim 13 wherein said body portion of said inflatable restraint is contacted by inflation fluid flowing from said inflator when said inflator is actuated to move said body portion of said inflatable restraint and said container in said first direction away from said inflator.

18. A vehicle occupant safety apparatus as set forth in claim 13 wherein said container includes walls for maintaining said first portion of said body portion of said inflatable restraint in a folded condition during movement from the first position to the second position.

19. A vehicle occupant safety apparatus as set forth in claim 13 wherein said container is disposed inside said inflatable restraint.

20. A vehicle occupant safety apparatus as set forth in claim 13 wherein said inflatable restraint includes an elongate tubular neck portion having first and second opposite end portions, said first end portion comprising said mouth portion of said inflatable restraint, said second end portion being connected in fluid communication with said body portion of said inflatable restraint, said means for placing said mouth portion of said inflatable restraint in fluid communication with said inflator including first securing means for connecting said first end portion of said neck portion of said inflatable restraint with said inflator to block movement of said mouth portion relative to said inflator, said apparatus further comprising second securing means movable relative to said first securing means for securing said second end portion of said neck portion of said inflatable restraint to said container at a location spaced apart from said first securing means.

21. A vehicle occupant safety apparatus as set forth in claim 20 wherein said tubular neck portion of said inflatable restraint includes a section of said inflatable restraint which extends between said first securing means and said second securing means and which is extensible from a collapsed condition when said container is in the first position to an extended condition when said container is in the second position, said extensible section of said inflatable restraint when in the extended condition being tensioned to limit movement of said container in said first direction.

22. A vehicle occupant safety apparatus as set forth in claim 13 wherein said body portion of said inflatable restraint inflates in a second direction transverse to said first direction.

23. A vehicle occupant safety apparatus as set forth in claim 22 wherein said first direction is a sideways direction in the vehicle and said second direction is a forward direction in the vehicle.

24. A vehicle occupant safety apparatus as set forth in claim 22 wherein said first direction is an upward direction in the vehicle and said second direction is a forward direction in the vehicle.

25. A vehicle occupant safety apparatus as set forth in claim 13 further comprising means for mounting said inflatable restraint and said inflator in a headrest portion of a vehicle seat back for protecting the vehicle occupant in the event of a side impact to the vehicle of a magnitude sufficient to require protection of the vehicle occupant.

26. A vehicle occupant safety apparatus as set forth in claim 25 wherein the vehicle seat back has inboard and outboard sides, said first direction extending in a direction from the inboard side of the vehicle seat back to the outboard side of the vehicle seat back, said body portion of said inflatable restraint inflating in a second direction which extends forward from the vehicle seat back.

27. A vehicle occupant safety apparatus as set forth in claim 26 wherein said seat back of said vehicle seat includes a headrest, said housing being supported on said seat back at a location inside said headrest.

28. A vehicle occupant safety apparatus for helping to protect an occupant of a vehicle in the event of a side impact to the vehicle, said apparatus comprising:

a seat for supporting an occupant of the vehicle in a seated position in the vehicle, said seat including a seat bottom portion and a seat back;

an inflatable vehicle occupant restraint mounted in said vehicle seat back for, when inflated, protecting the vehicle occupant, said inflatable restraint having a deflated condition and an inflated condition;

an inflator for, when actuated, supplying inflation fluid to said inflatable restraint to inflate said inflatable restraint;

said inflatable restraint having a mouth portion for receiving inflation fluid from said inflator and a body portion which is connected with said mouth portion and which is for engagement by the occupant's head when inflated;

means for placing said mouth portion of said inflatable restraint in fluid communication with said inflator;

a support for at least a first portion of said body portion of said inflatable restraint when said inflatable restraint is in the deflated condition;

means for sensing a side impact to the vehicle of a magnitude sufficient to require inflation of said inflatable restraint and for actuating said inflator to inflate said inflatable restraint in response to sensing said side impact to the vehicle; and means for mounting said support and said first portion of said body portion of said inflatable restraint for movement in a first direction away from said inflator from a first position to a second position from which said folded body portion inflates into a position to protect the vehicle occupant.

29. A vehicle safety apparatus as set forth in claim 28 wherein said seat back of said vehicle seat includes a headrest, said housing being supported on said seat back at a location inside said headrest.

30. A vehicle safety apparatus as set forth in claim 28 wherein said support is supported for movement from a first position which is inside of said seat to a second position which is outside of said seat.

31. A vehicle safety apparatus as set forth in claim 28 wherein said first direction extends generally sideways in the vehicle and said second direction extends generally forward in the vehicle.

32. A vehicle safety apparats as set forth in claim 28 wherein said seat includes support means extending generally vertically in said seat, said apparatus further comprising a housing connected with said support means, said housing defining an inflation fluid chamber into which inflation fluid is directed upon actuation of said inflator, said mouth portion of said inflatable restraint being connected with said housing in fluid communication with said inflation fluid chamber in said housing.

* * * * *